United States Patent [19]

Epstein et al.

[11] Patent Number: 5,159,031
[45] Date of Patent: Oct. 27, 1992

[54] SULFONATED POLYANILINE SALT COMPOSITIONS AND USES THEREOF

[75] Inventors: Arthur J. Epstein, Bexley; Jiang Yue, Columbus, both of Ohio

[73] Assignee: Ohio State University Research Foundation, Columbus, Ohio

[21] Appl. No.: 529,344

[22] Filed: May 25, 1990

Related U.S. Application Data

[63] Continuation-in-part of Ser. No. 426,959, Oct. 24, 1989, which is a continuation-in-part of Ser. No. 423,902, Oct. 19, 1989, which is a continuation-in-part of Ser. No. 193,964, May 13, 1988, Pat. No. 5,079,334.

[51] Int. Cl.$^5$ .......................................... C08F 283/00
[52] U.S. Cl. ..................................... 525/540; 429/29; 429/204; 437/909; 528/422; 359/265
[58] Field of Search ................. 525/540; 429/29, 204; 437/909

[56] References Cited

U.S. PATENT DOCUMENTS

| | | | |
|---|---|---|---|
| 3,941,810 | 3/1976 | Koebner | 549/66 |
| 4,488,943 | 12/1984 | Skotheim | 204/58.5 |
| 4,556,623 | 12/1985 | Tamura et al. | 430/73 |
| 4,585,581 | 4/1986 | Skotheim | 252/518 |
| 4,586,792 | 5/1986 | Yang et al. | 350/357 |
| 4,604,427 | 8/1986 | Roberts et al. | 525/185 |
| 4,615,829 | 10/1986 | Tamura et al. | 528/490 |
| 4,636,430 | 1/1987 | Moehwald | 428/304.4 |
| 4,742,867 | 5/1988 | Walsh | 165/96 |
| 4,749,260 | 6/1988 | Yang et al. | 350/357 |
| 4,822,638 | 4/1989 | Yaniger | 427/79 |
| 4,851,487 | 7/1989 | Yaniger et al. | 525/540 |
| 4,855,361 | 8/1989 | Yaniger | 525/436 |
| 4,935,164 | 6/1990 | Wessling et al. | 252/500 |
| 4,973,391 | 11/1990 | Madou et al. | 204/78 |

FOREIGN PATENT DOCUMENTS 61-197633 2/1985 Japan .

OTHER PUBLICATIONS

Paul, et al., J. Phys. Chem. 89:1441–1447 (1985).
Stafstrom et al., Phys. Rev. Lett. 59:1464 (1987).
Rice et al., Phys. Rev. Lett., 49:1455 (1982).
Bredas et al., Phys. Rev. B29:6761 (1984).
Chiang et al., Synth. Met. 13:193 (1986).
Ginder et al., Solid State Commun., 63:97 (1987).
Epstein et al., Synth. Met., 18:303 (1987).
Choi et al., Phys. Rev. Met., 59:2188 (1987).
Skotheim et al., Electrochem. Soc., 132:246 (1985).
Obayashi et al., Adv. Chem. Ser., 163;316 (1977).
Sammels et al., J. Electrochem. Soc., 131:617 (1984).
Chao et al., J. Am. Chem. Soc., 109:6627 (1987).
Hardy et al., J. Am. Chem. Soc., 1071:3823 (1985).
Gregory et al., Synthetic Metals, 28:C823–C835 (1989).
Nakajima et al., Synthetic Metals, 28:C629–C638 (1989).
Mizumoto et al., Synthetic Metals, 28:C639–C646 (1989).
Angelopoulos et al., J. Vac. Sci. Technol. B7 (6) Nov./Dec. 1989.
Lacroix et al., J. Electrochem. Soc., 136:1308–1313 (1989).
Computer search performed in the 1989 Am. Chem. Soc., (1989).
Chem. Abstracts, 106:33982g (1987).
WPI Data Base Search of JP Patent No. 61-197633.
Noshay et al., J. App. Polymer Sci., 20:1885–1903 (1976).
Declaration of Arthur J. Epstein.

*Primary Examiner*—John Kight, III
*Assistant Examiner*—Shelley A. Wright
*Attorney, Agent, or Firm*—Emch, Schaffer, Schaub & Porcello Co.

[57] ABSTRACT

Sulfonic acid-substituted polyaniline salt compositions and uses therefor are disclosed. The sulfonated polyaniline salt compositions have fast electronic and optical responses to electrochemical potentials, improved environmental stability, and improved solubility. The sulfonated polyaniline salt compositions are useful as an ionic electrolyte polymer.

6 Claims, 3 Drawing Sheets

SULFONATED POLYANILINE SALT COMPOSITIONS AND USES THEREOF

BACKGROUND OF THE INVENTION

The present invention is a continuation-in-part of co-pending application Ser. No. 07/426,959 filed Oct. 24, 1989 which is a continuation-in-part of co-pending application Ser. No. 07/423,902 filed Oct. 19, 1989 which is a continuation-in-part of co-pending application Ser. No. 193,964 filed May 13, 1988, now U.S. Pat. No. 5,079,334; and, which the entire disclosure of each application is expressly incorporated herein by reference.

The present invention relates to sulfonic acid-substituted polyaniline salt compositions, their derivatives and uses thereof.

Polyaniline is a family of polymers that has been under intensive study recently because the electronic, chemical and optical properties of the polymers can be modified through variations of either the number of protons, the number of electrons, or both. The polyaniline polymer can occur in several general forms including the so-called reduced form (leucoemeraldine base), possessing the general formula

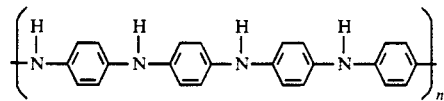

the partially oxidized so-called emeraldine base form, of the general formula

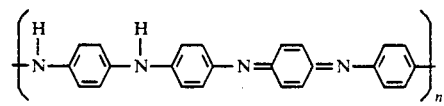

and the fully oxidized so-called pernigraniline form, of the general formula

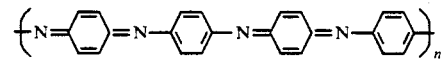

In practice, polyaniline generally exists as a mixture of the several forms with a general formula (I) of

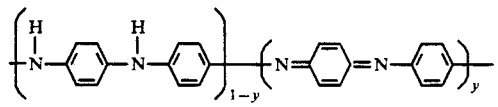

When $0 \leq y \leq 1$, the polyaniline polymers are referred to as poly(paraphenyleneamineimines) in which the oxidation state of the polymer continuously increases with decreasing value of y. The fully reduced poly(-paraphenyleneamine) is referred to as leucoemeraldine, having the repeating units indicated above corresponding to a value of $y=1$. The fully oxidized poly(paraphenyleneimine) is referred to as pernigraniline, of repeat unit shown above corresponds to a value of $y=0$. The partly oxidized poly(paraphenyleneamineimine) with y in the range of greater than or equal to 0.35 and less than or equal to 0.65 is termed emeraldine, though the name emeraldine is often focused on y equal to or approximately 0.5 composition. Thus, the terms "leucoemeraldine", "emeraldine" and "pernigraniline" refer to different oxidation states of polyaniline. Each oxidation state can exist in the form of its base or in its protonated form (salt) by treatment of the base with an acid.

The use of the terms "protonated" and "partially protonated" herein includes, but is not limited to, the addition of hydrogen ions to the polymer by, for example, a protonic acid, such as mineral and/or organic acids. The use of the terms "protonated" and "partially protonated" herein also includes pseudoprotonation, wherein there is introduced into the polymer a cation such as, but not limited to, a metal ion, $M^+$. For example, "50%" protonation of emeraldine leads formally to a composition of the formula

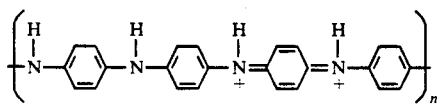

which may be rewritten as

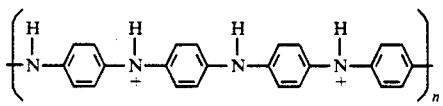

Formally, the degree of protonation may vary from a ratio of $[H^+]/[-N=]=0$ to a ratio of $[H^+]/[-N=]=1$. Protonation or partial protonation at the amine (—NH—) sites may also occur.

The electrical and optical properties of the polyaniline polymers vary with the different oxidation states and the different forms. For example, the leucoemeraldine base, emeraldine base and pernigraniline base forms of the polymer are electrically insulating while the emeraldine salt (protonated) form of the polymer is conductive. Protonation of emeraldine base by aqueous HCl (1M HCl) to produce the corresponding salt brings about an increase in electrical conductivity of approximately $10^{12}$; deprotonation occurs reversibly in aqueous base or upon exposure to vapor of, for example, ammonia. The emeraldine salt form can also be achieved by electrochemical oxidation of the leucoemeraldine base polymer or electrochemical reduction of the pernigraniline base polymer in the presence of an electrolyte of the appropriate pH. The rate of the electrochemical reversibility is very rapid; solid polyaniline can be switched between conducting, protonated and nonconducting states at a rate of approximately $10^5$ Hz for electrolytes in solution and even faster with solid electrolytes. (E. Paul, et al., *J. Phys. Chem.* 1985, 89, 1441–1447). The rate of electrochemical reversibility is also controlled by the thickness of the film, thin films exhibiting a faster rate than thick films. Polyaniline can then be switched from insulating to conducting form as a function of protonation level (controlled by ion insertion) and oxidation state (controlled by electrochemical potential). Thus, polyaniline can be turned "on" by either a negative or a positive shift of the electrochemical potential, because polyaniline films are essentially insulating at sufficiently negative (approximately 0.00 V vs. SCE) or positive (+0.7 V vs. SCE) electrochemical potentials. Polyaniline can also then be turned "off" by an opposite shift of the electrochemical potential.

The conductivity of polyaniline is known to span 12 orders of magnitude and to be sensitive to pH and other chemical parameters. It is well-known that the resistance of films of both the emeraldine base and 50% protonated emeraldine hydrochloride polymer decrease by a factor of approximately 3 to 4 when exposed to water vapor. The resistance increases only very slowly on removing the water vapor under dynamic vacuum. The polyaniline polymer exhibits conductivities of approximately 1 to 20 Siemens per centimeter (S/cm) when approximately half of its nitrogen atoms are protonated. Electrically conductive polyaniline salts, such as fully protonated emeraldine salt [(—$C_6H_4$—NH—$C_6H_4$—$NH^+$)—$Cl^-$]$_x$, have high conductivity ($10^{-4}$ to $10^{+2}$ S/cm) and high dielectric constants (20 to 200) and have a dielectric loss tangent of from below $10^{-3}$ to approximately $10^1$. Dielectric loss values are obtained in the prior art by, for example, carbon filled polymers, but these losses are not as large nor as readily controlled as those observed for polyaniline.

Electrochemistry of molecular materials can be affected without using liquid electrolyte solutions as discussed in Skotheim, T. A., et al. *J. Electrochem. Soc.*, 1985, 132, 2116. It is also well appreciated that solid-state ionic conductors are useful in battery and fuel-cell applications. Obayashi, H., et al. *Adv. Chem. Ser.*, 1977, 163, 316. Solid-state photoelectrochemical devices that involve the use of solid-state ionic conductors have been reported in Sammels, A. F., et al., *J. Electrochem. Soc.*, 1984, 131, 617. A solid-state PAN-based transitor is also reported in Chao, S., et al., *J. Am. Chem. Soc.*, 1987, 109, 6627.

The first generation of polymer solid electrolyte was based on alkali metal salts dissolved in polyethers such as high molecular weight (M.W. 600,000) poly(ethylene oxide) (PEO), (—$CH_2CH_2O$—)$_n$. The absense of solvents and reactive groups results in a wide electrochemical stability window and therefore compatibility with highly reactive electrode materials. In addition, single ionic conductivity has been achieved in sodium poly(styrene sulfonate) as discussed in Hurdy, L. C., et al., *J. Am. Chem. Soc.*, 1985, 107, 3823.

The preparation of sulfonated polyaniline compositions, which are capable of being "self-protonated" or "self-doped", are disclosed in the co-pending application Ser. No. 07/423,902, filed on Oct. 19, 1989, the entire disclosure of which is expressly incorporated herein by reference.

The present invention also relates to the co-pending parent application Ser. No. 07/426,959 filed Oct. 24, 1989, which disclosed the preparation of sulfonated polyaniline salt compositions, the entire disclosure of which is expressly incorporated herein by reference.

SUMMARY OF THE INVENTION

The present invention provides nonprotonated sulfonated polyaniline salt compositions which are ionically conducting polymers and which are easy to dissolve in aqueous solutions. The process for producing the nonprotonated sulfonated polyaniline salt compositions comprises reacting a sulfonated polyaniline polymer with a basic solution, such as NaOH, KOH and the like. The sulfonated polyaniline salt compositions are very soluble in water at high densities and are therefore useful as interim materials in producing self-protonated sulfonated polyaniline compositions.

The present invention further relates to the use of sulfonated polyaniline salt compositions as a solid, solvent-free polymer electrolyte which is capable of being used in such applications as, for example, high energy density batteries, fuel cells, solid-state ionic conductors in solid-state photoelectrochemical devices, and solid-state transistors.

DETAILED DESCRIPTION OF THE INVENTION

The present invention relates to sulfonic acid substituted polyaniline salt compositions, their derivatives, and uses thereof.

The sulfonated polyaniline salt compositions have the formula I

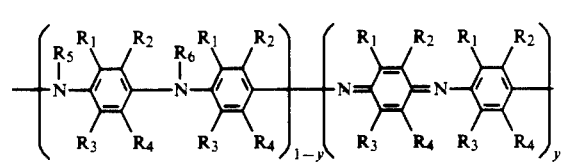

wherein $0 \leq y \leq 1$; $R_1$, $R_2$, $R_3$, $R_4$, $R_5$ and $R_6$ are independently selected from the group consisting of H, —$SO_3H$, —$R_7SO_3H$, —$SO_3M$, —$R_7SO_3M$, —$OCH_3$, —$CH_3$, —$C_2H_5$, —F, —Cl, —Br, —I, —$NR_7{}_2$, —NHCOR$_7$, —OH, —$O^-$, —Sr$_7$, —OCOR$_7$, —$NO_2$, —COOH, —COOR$_7$, —COR$_7$, —CHO and —CN, wherein $R_7$ is a $C_1$-$C_8$ alkyl, aryl or aralkyl group and M is a positive cation or counterion, for example $NH_4{}^+$, $Li^+$, $Na^+$, $K^+$, $Rb^+$, $Cs^+$, $Ca^{++}$, $Ba^{++}$ and the like; at y=0.5, "x" is defined as that fraction of phenyl or quinoid rings that have an —$SO_3{}^-$ group and where z is that fraction of these phenyl or quinoid rings that have the M positive cation; such that when z is much less than x, the composition is an electron conductor and as z approaches x, the composition becomes an ionic conductor.

The fraction of rings containing at least one $R_1$, $R_2$, $R_3$ or $R_4$ groups being an —$SO_3M$, or —$R_7SO_3M$ can be varied from a few percent to one hundred percent. In certain embodiments the percentage ranges from at least approximately 20% up to and including 100%. It is within the contemplated scope of the present invention that the —R$_7$SO$_3$M substituents can be varied so that the sulfonated polyaniline is soluble in a range of solvents in order to make the sulfonated polyaniline salt composition more easily blendable with other polymers and/or more easily cast onto a variety of surfaces.

The sulfonated polyaniline has a conductivity of 0.1 S/cm without external doping which makes the sulfonated polyaniline a self-protonated conducting polymer. In contrast, a salt (Na$^+$ or K$^+$, for example) of the sulfonated polyaniline is an ionic conductor.

The chemical synthesis of the sulfonated polyaniline salt compositions of the present invention is accomplished by reacting sulfonated polyaniline with a basic solution.

Figure 4:
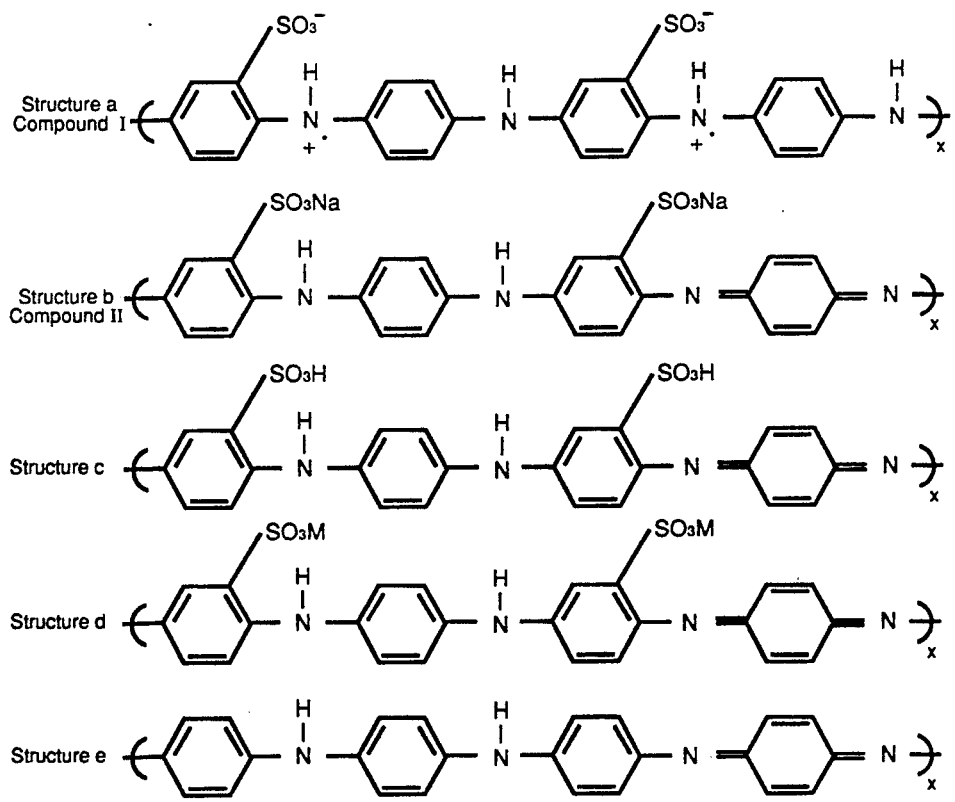
FIG. 4 is a schematic illustration of the different structure of sulfonated polyaniline, (a and c), the sodium salt (b), salt (d) and the emeraldine base (e).

An example of the synthesis of sulfonated, non-protonated sodium polyaniline salt follows: 1 g of sulfonated, protonated polyaniline in the emeraldine oxidative state (structure a, compound I, in FIG. 4) was dissolved in 40 ml 0.1M NaOH solution. The color of the solution was blue-violet. The water was removed from the solution by slowly reducing the pressure of the polymer solution at room temperature. After most of the water was gone, the polymer was transferred to a vacuum desicator and dried under dynamic vacuum for 24 hours. The sulfonated, non-protonated sodium polyaniline salt, shown as structure b, compound II, in FIG. 4 was then obtained.

Infrared spectra were obtained by mixing the either compound I or the compound II into KBr matrix, pressing into pellets and recording on an FTIR spectrometer.

For taking electronic spectra the compound I was dissolved in 0.1M NH$_4$OH to form a homogeneous solution, the polymer solution was then cast on a quartz substrate. Slow evaporation of the aqueous solution of the compound II (ammonium salt) in air at room temperature resulted in spontaneous removal of the weak volatile base, NH$_3$ with reformation of the compound I. Compound II was dissolved in either H$_2$O/NMP(N-methyl 2-pyrrolidinone) solution for taking the spectra.

Conductivities of the compound I and compound II were measured on compressed pellets of the powder by using four point probe techniques with a Keithley 220 constant current source and Keithley 181 voltmeter.

The compound I was cast on a Pt electrode by evaporating a solution of the polymer in 0.1M ammonium hydroxide and subsequently dried in air. In order to obtain reproducible cyclic voltammograms the electrode was preconditioned by cycling between −0.2 and 0.4 volts vs Ag/AgCl for about 10 minutes (25 cycles).

Elemental analyses, infrared and electronic spectroscopy, conductivity and cyclic voltammetry studies are consistent with the sulfonation of emeraldine base with fuming sulfuric acid proceeding to give a self-doped, sulfonated, protonated forms of the emeraldine oxidative state of polyaniline, the compound I (shown as structure a in FIG. 4) which has a conductivity of about 0.1 S/cm. This polymer can be regarded as being formed by the hypothetically initial formation of the strong acid, shown as structure c in FIG. 4, which then immediately protonates the imine nitrogen atoms to give the conducting polymer in an entirely analogous manner to strong acids such as HCl. Treatment of the structure c compound with an aqueous base yields the sulfonated, non-protonated ionically conducting salt forms analogous to emeraldine base, viz, the structure d compound shown in FIG. 4.

Figure 1:
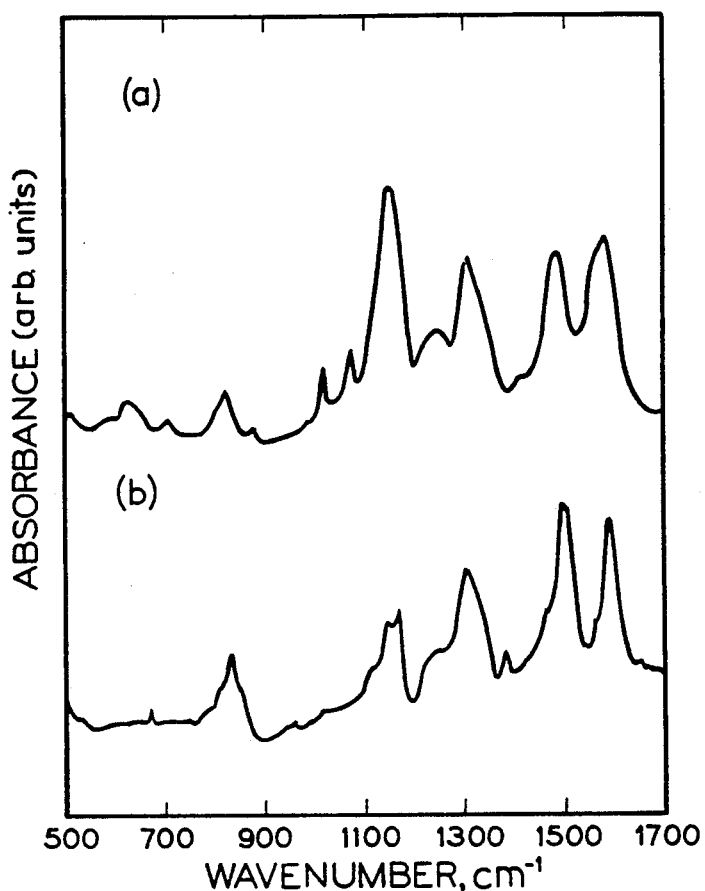
FIG. 1 is a graph illustrating the FTIR spectra of (a) self-doped sulfonated polyaniline; (b) emeraldine base, the parent polymer of sulfonated polyaniline in wave numbers $cm^{-1}$.

With respect to the above structure, sulfonation occurs preferentially in alternating rings and that under the present experimental conditions, only half the rings were sulfonated. This is consistent with the increased stability of the semiquinone form. Increased sulfonation (increased x) improves ionic conductivity although further sulfonation and consequently double protonation of nitrogen atoms convert some of the -(NH)-to-(NH$_2$+)- and hence reduce the conjugation of the polymer. The FTIR spectrum shown in FIG. 1 of the self-doped polyaniline, the compound I, is consistent with the presence of —SO$_3$$^-$ groups alternated to the aromatic rings. IR shows absorption maxima of out of plane bending of aromatic hydrogens at 820 and 870 cm$^{-1}$ are indicative of 1, 2, 4 trisubstitutents on the rings. The absorptions are not present in the 1, 2 disubstituted emeraldine base from which the compound I was synthesized. Absorption peaks at 1080, 700 and 590 cm$^{-1}$ are consistent with the presence of SO$_3$$^-$ groups.

The conductivity of the compound I ($\sigma \sim 0.1$ S/cm) is similar to that of emeraldine hydrochloride measured under the same experimental conditions ($\sigma \sim 1$-5 S/cm; laboratory air), but lower than that $\sigma \sim 18$ S/cm of high molecular weight emeraldine hydrochloride. The self-doped sulfonated polyaniline with emeraldine oxidative state differs dramatically from nonexternally doped polyaniline, structure e shown in FIG. 4, in conductivity. Since sulfonic acid is a strong acid, approximately as strong as hydrochloric acid, the compound I is capable of doping itself. Pressed pellets of the dark green self-doped compound I had a room temperature conductivity of about 0.1 S/cm in contrast to the purple color and insulating behavior of polyaniline emeraldine base form. However, the conductivity of compound I is lower than that of emeraldine hydrochloride pressed pellets; analogy with earlier study of poly(o-toluidine), the lower conductivity is in accord with increased conduction electron localization induced by the side chain effects of —SO$_3$$^-$.

Figure 5:
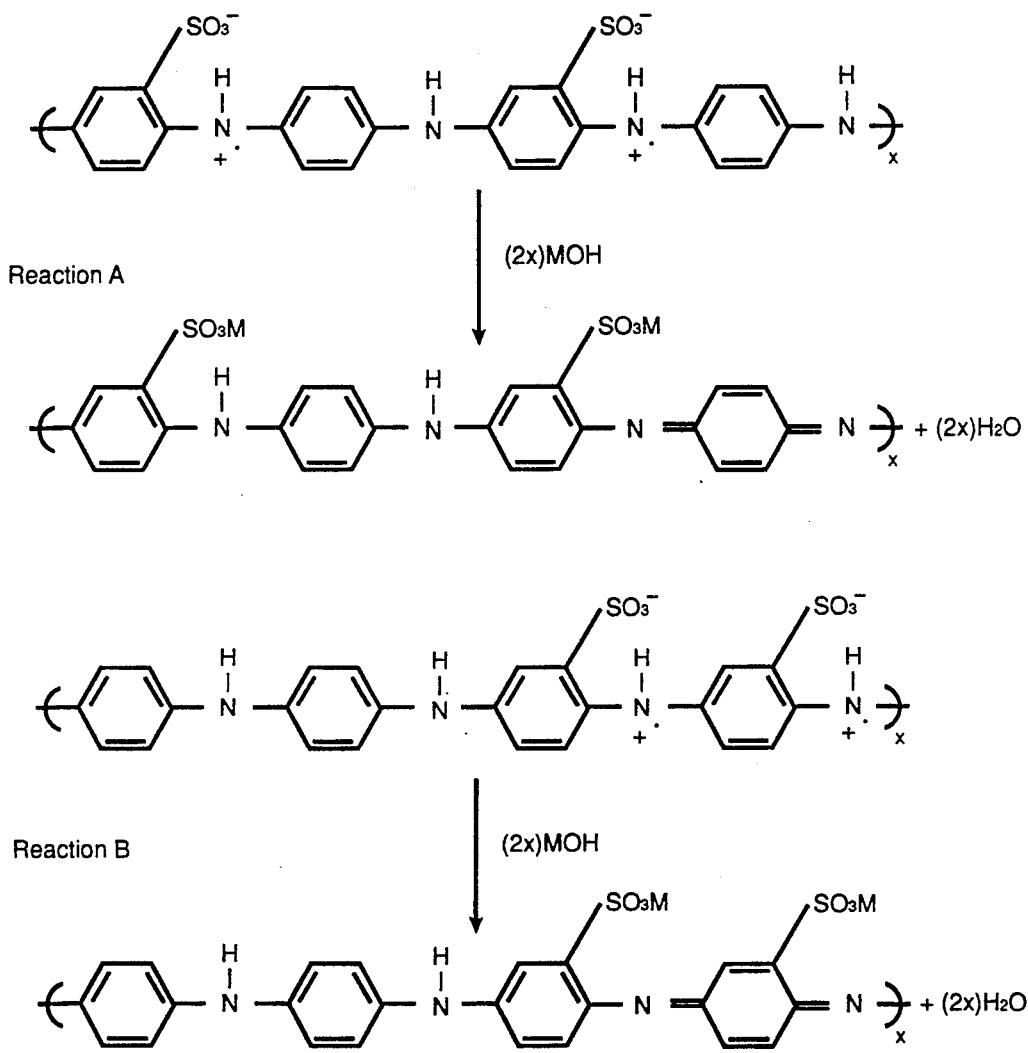
FIG. 5 is a schematic illustration of the equilibrium between self-doped sulfonated polyaniline and its base form in aqueous MOH solution.

The solubility of the compound I and compound II also differ markedly from that of the corresponding polyaniline polymer. The compound I dissolves completely in aqueous 0.1M NH$_4$OH or NaOH to give a blue-violet solution while polyaniline washed with such solvent converts to the insoluble base form. When in the basic aqueous solvent, the polymer backbone is in the emeraldine base structure with SO$_3$$^-$ forming a salt with NH$_4$$^+$ or Na$^+$, i.e. compound II. The compound I partially dissolves in NMP to form a blue color solution and as well as DMSO (dimethyl sulfoxide) to show green color. The compound II dissolves in the water showing a blue-violet color and H$_2$O/NMP forming a blue solution. The compound II also partially dissolves in NMP with blue color and in DMSO with dark blue color. Treatment of the self-doped polyaniline, compound I, with an aqueous base proceeds consequently to the deprotonation of the backbone of the polymer to form the structure corresponding to emeraldine base, as shown in the reaction A or reaction B depicted in FIG. 5.

In both cases the deprotonation results in a 5 to 10 order of magnitude decrease in conductivity depending on the nature of the metal ions. The sulfonated, non-protonated polyaniline salt composition is analogous to the emeraldine base (shown as structure e in FIG. 4), except that it is a salt combining two anionic —SO$_3$$^-$ groups per four (ring-N) units. Compound I and II differ from emeraldine hydrochloride in that they are soluble in aqueous 0.1M NH$_4$OH and NaOH. The anionic polymer chain present in the compound II is responsible for its solubility in water.

Based on solid state $^{13}$C NMR studies, [T. Hjertberg, W. R. Salaneck, I. Landstrom, N. L. D. Somasiri and A. G. MacDiarmid, *J. Polymer Sci; Polym. Lett. Ed.*, 23 (1985) 503] it has been reported that adjacent phenyl rings of the emeraldine backbone are noncoplanar. Introduction of sulfonic acid groups on phenyl rings of the polyaniline backbone can be expected to increase the torsional angle between adjacent rings to relieve steric strain.

Figure 2:
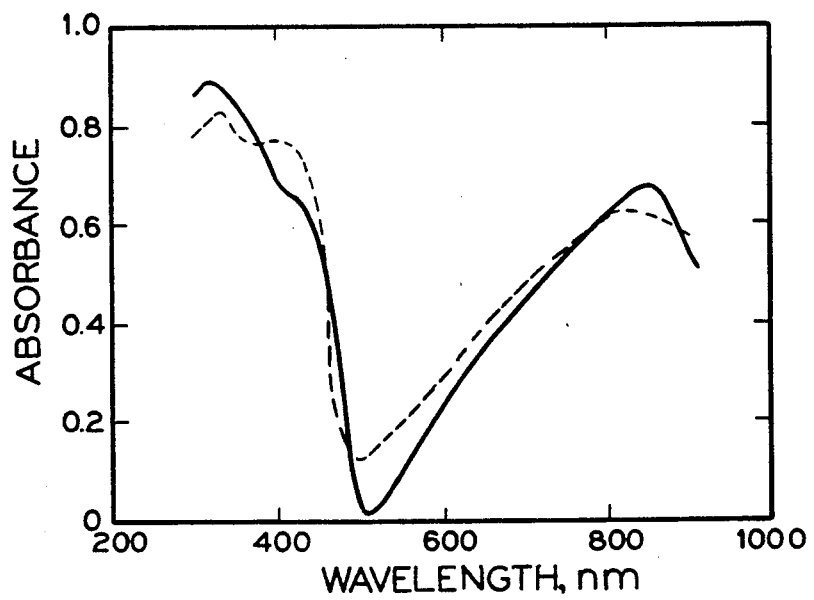
FIG. 2 is a graph illustrating the electronic absorption spectra of (a)—sulfonated polyaniline film cast from an aqueous $NH_4OH$ solution in a quartz substrate, then dried in air, (b)—emeraldine salt film.

Comparisons of the electronic absorption spectra of the compound I and the emeraldine salt and compound II and emeraldine base provide insight into changes in the molecular geometry caused by the sulfonic group-substitution on the polyaniline backbone. Steric effects are considered in the interpretation of the electronic absorption spectra of the sulfonated polyaniline. In order to compare the feature of the electronic spectra of the self-doped polymer (compound I) and emeralidine hydrochloride, their spectra are given in FIG. 2. The high energy absorption band at 320 nm(3.88 eV) and 326 nm(3.81 eV) for compound I and emeraldine hydrochloride, respectively, is assigned to the pi-pi* transition based on earlier experimental and theoretical studies. The other two absorption bands at 435 nm(2.38 eV) and 850 nm(1.46 eV) for the compound I, 413 nm(3.00 eV) and 826 nm(1.50 eV) for emeraldine hydrochloride, have been assigned to the optical absorption of the metallic polaron band of the salt form. The hypsochromic shift of the pi-pi* transition in going from emeraldine hydrochloride to compound I is again in accord with decreased extend of conjugation caused by increased phenyl ring torsion angle which results from steric repulsion between the —SO$_3^-$ groups and hydrogens on the adjacent phenyl rings. The bathochromic shift of the polaron band transition is also in agreement with relative energy band shifts expected for increased ring torsion angles.

Temperature dependent electron spin resonance studies show a 0.4 G peak to peak linewidth for compound I at room temperature similar in intensity to that of emeralidine salt. This result supports that compound I is in the polysemiquinone (polaron energy band) state.

Figure 3:
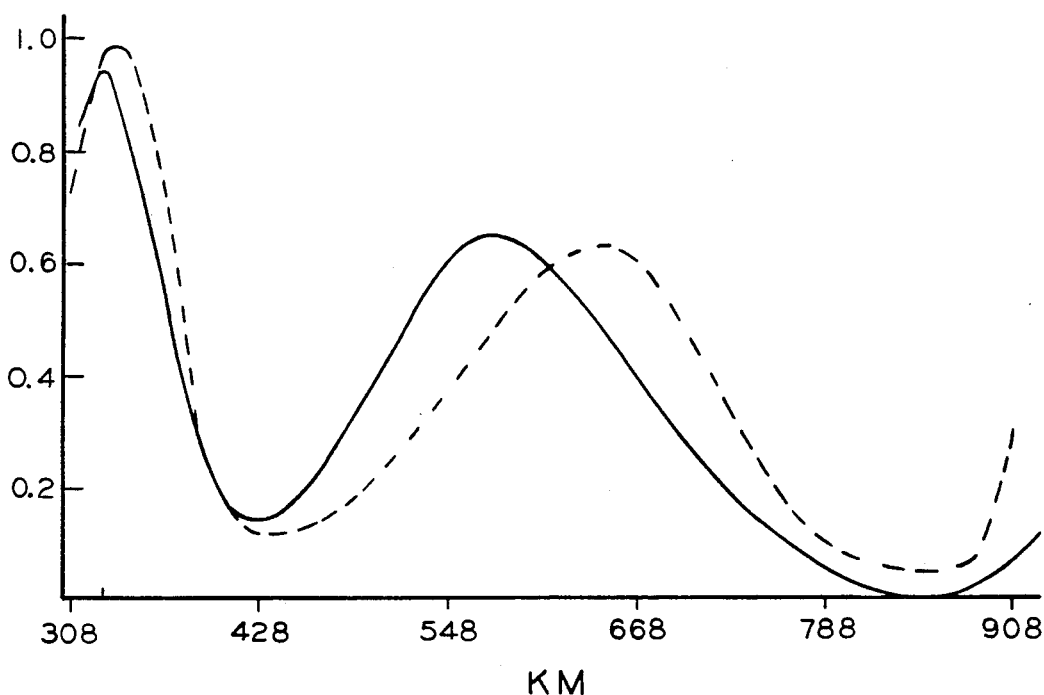
FIG. 3 is graph illustrating the electronic absorption spectra of (a)—sulphonated polyaniline in $NH_4OH$, maxima at 320 nm (3.88 eV) and 563 nm (2.20 eV); (b)—emeraldine base in NMP, maxima at 330 nm (3.76 eV) and 620 nm (2.00 eV).

The electronic spectra of compound II and emeraldine base consist of two major absorption bands as shown in FIG. 3. The first absorption band at 320 nm(3.88 eV) and 330 nm(3.76 eV) for compound II and emeraldine base, respectively, is assigned to the pi-pi* transition based on the earlier studies of polyaniline. This absorption shifts somewhat with increasing oligomer length. The pi-pi* transition band shows a hypsochromic shift from 3.76 eV for emeraldine base to 3.88 eV for compound II. The blue shift implies the decrease of the extent of the conjugation and an increase of the band gap of this polymer. The adjacent phenyl rings of the polymer have larger C—N=C angles with respect to the plane of the nitrogens due to the possible steric repulsion between —SO$_3^-$ Na$^+$ groups and hydrogens on the adjacent phenyl rings. The second absorption band at 563 nm(2.20 eV) and 620 nm(2.00 eV) for compound II in H$_2$O and emeraldine base in NMP, respectively, also has a substantial hypsochromic shift with sulfonation. This band has been assigned to an absorption from the highest occupied molecular orgital (HOMO) based band centered on the benzenoid units to the lowest unoccupied molecular orbital (LUMO) centered on the quinoid units. When the absorption is intrachain, the excitation leads to formation of a "molecular" exciton (with positive charge on adjacent benzenoid units bound to the negative charge centered of the quinoid), while interchain charge transfer from HOMO to LUMO may lead to formation of positive and negative polarons. The increase in this transition energy is also in accord with increased ring torsion angles due to steric repulsion.

The sulfonation of polyaniline has dramatic changes in its solubility and solution properties. For example, compound II dissolved in water gave a 2.20 eV absorption, however, the transition of such band is changed from 2.20 eV to 2.00 eV by adding NMP into the solution. The origin of this is that water is a more polar solvent with smaller volume comparing to NMP, hence it partially solvates the imine nitrogens resulting in larger torsional angle, causing the hypsochromic shift.

The present invention further relates to the uses of the sulfonated polyaniline salt compositions and their derivatives in electronic, electrochemical, chemical, and optical applications.

The sulfonated polyaniline salt compositions can be coated by a variety of techniques onto substrates of choice. The sulfonated polyaniline salt compositions can be applied to substrates according to the present invention by spray coating, dip coating, spin casting, transfer roll coating, brush-on coating, and the like. The sulfonated polyaniline polymers can also be electrochemically deposited onto conductive substrates by known electrochemical deposition techniques.

The sulfonated polyaniline salt compositions of the present invention are useful as an interim material in the making of self-protonated sulfonated polyaniline compositions. The sulfonated polyaniline salt compositions are very soluble in water, while the sulfonated polyaniline compositions are only slightly soluble in water. For example, the sulfonated polyaniline salt compositions can be dissolved in water at very high densities and can be very uniformly applied to a substrate. After application to the substrate the ionically conducting sulfonated polyaniline salt composition can be converted to the electrically conducting sulfonated polyaniline composition. In the case where the counterion is, for example, NH$_4^+$, the NH$_4^+$ can be evaporated off. In the case where the counterion is for example, Na$^+$, K$^+$, Rb$^+$, Cs$^+$ or Ca$^{++}$, is dissolved or washed off by using an acid such as, for example HCl where the Na$^+$ is then replaced by the proton H$^+$.

The sulfonated polyaniline salt compositions and derivatives thereof have, or can be designed to have, desired processability in terms of, for example, viscosity, flexural strengths, solubility, adhesion to substrates, crosslinking, melting point, weight, adaptability to filler loading and the like. This is achieved by varying as desired the degree of protonation, the state of oxidation, and the type and degree of substituents on the polymer. Certain substituents may be preferred for the facilitation of desired processing parameters, such as increasing or decreasing solubility, altering extrusion parameters (rheology), achieving a specific viscosity, and the like. Derivatization is also useful for achieving compatibility with a copolymer.

The sulfonated polyaniline salt compositions of the present invention are useful in preparing gradients of conductivity. The conductivity of the material can be varied by varying the density as well as the size, mass of the positive cation (e.g. Li$^+$, Na$^+$, K$^+$, Rb$^+$, Cs$^+$, $NH_4^+$, $Ca^{++}$ and the like) from 0 to 0.5 per phenyl or quinoid ring. As such, the composition changes from electron conducting to ionic conducting as the number of positive cations approaches the number of sulfonic groups in the compositions. Thus, by varying the ratio of electron conducting to ionic conducting, a gradient of conductivity is established: where x is that fraction of phenyl or quinoid rings that have an $—SO_3^-$ group, and where z is the fraction of these phenyl or quinoid rings that have a positive cation; when z is much less than x, the compound is an electron conductor and as z approaches x, the compound becomes ionic conducting or insulating. Therefore, one can vary the conductivity by varying the z/x ratio, as well as choosing positive cations.

The sulfonated polyaniline salt compositions are useful as an ionic polymer electrolyte. For example, the sodium salt of a sulfonated polyaniline composition has similar properties to sodium poly(styrene sulfonate) and has an ionic conductivity of about $10^{-7}$ S/cm at about room temperature. The sodium ion transport in the sulfonated polyaniline salt composition makes such composition especially useful as a solid, solvent-free polymer electrolyte. The absence of solvents and reactive groups in such polymer provides a wide range of electrochemical stability which thus makes such sulfonated polyaniline salt compositions compatible with highly reactive electrode materials.

Sulfonated polyaniline salt compositions can be used in solid, solvent-free polymer electrolyte applications due to the counterion transport in the sulfonated polyaniline salt composition. An electrolyte comprising a sulfonated polyaniline salt composition can be used with a highly reactive electrode material in making high energy density batteries, fuel cells, solid-state ionic conductors in solid-state photoelectrochemical devices (such as displays), and solid-state transistors.

While the invention has been disclosed in this patent application by reference to the details of preferred embodiments and examples of the invention, it is to be understood that this disclosure is intended in an illustrative rather than in a limiting sense, as it is contemplated that modifications will readily occur to those skilled in the art, within the spirit of the invention and the scope of the claims which follow.

We claim:

1. An ionic polymer electrolyte comprising a self-doped, sulfonated polyaniline salt composition having a chemical composition of formula I

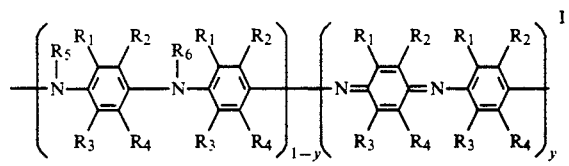

wherein $0 \leq y \leq 1$, $R_1$, $R_2$, $R_3$, $R_4$, $R_5$ and $R_6$ are independently selected from the group consisting of H, $—SO_3H$, $—R_7SO_3H$, $—SO_3M$, $—R_7SO_3M$, $—OCH_3$, $—CH_3$, $—C_2H_5$, $—F$, $—Cl$, $—Br$, $—I$, $—N(R_7)_2$, $—NHCOR_7$, $—OH$, $—O^-$, $SR_7$, $—OR_7$, $—OCOR_7$, $—NO_2$, $—COOH$, $—COOR_7$, $—COR_7$, $—CHO$ and $—CN$, wherein $R_7$ is a $C_1$-$C_8$ alkyl, aryl or aralkyl group, wherein M is a positive cation; the sulfonated polyaniline composition being comprised of x and z fractions of phenyl or quinoid rings, wherein x is that fraction of phenyl or quinoid rings that have an $—SO_3^-$ group and wherein z is that fraction of phenyl or quinoid rings that have an $—SO_3^-$ group and the M positive cation; such that when the sulfonated polyaniline composition has fewer z fractions than x fractions, the composition is an electrical conductor and as the number of z fractions approaches the number of x fractions, the composition becomes nonconducting.

2. The electrolyte of claim 1, wherein the fraction of rings in the sulfonated polyaniline salt composition contains at least one $R_1$, $R_2$, $R_3$ or $R_4$ group being an $—SO_3M$, or $—R_7SO_3M$ varies from approximately 20 percent to one hundred percent.

3. The electrolyte of claim 1, wherein the sulfonated polyaniline composition is of molecular weight in the range of from approximately 300 (oligomers of sulfonated polyaniline) to in excess of 100,000.

4. The electrolyte of claim 1, wherein $R_1$ is selected from the group consisting of $—SO_3M$, and $—R_7SO_3M$ and $R_2 = R_3 = R_4 = H$.

5. The electrolyte of claim 1, wherein M is selected from the group consisting of $Li^+$, $Na^+$, $K^+$, $Rb^+$, $Cs^+$, $NH_4^+$, $Ca^{++}$, $Ba^{++}$.

6. The electrolyte of claim 1, wherein $z = 1$.